Nov. 28, 1967    F. W. MURPHY ET AL    3,355,560
COMBINATION FLOW RESPONSIVE SWITCH AND INDICATING GAGE
Filed May 17, 1966

INVENTORS.
FRANK W. MURPHY
FRANK W. MURPHY, JR.
BY Kimmel, Crowell & Weaver
ATTORNEYS.

United States Patent Office 3,355,560
Patented Nov. 28, 1967

3,355,560
COMBINATION FLOW RESPONSIVE SWITCH
AND INDICATING GAGE
Frank W. Murphy and Frank W. Murphy, Jr., both of
3131 S. Sheridan Road, P.O. Box 4537, Tulsa,
Okla. 74114
Filed May 17, 1966, Ser. No. 550,702
3 Claims. (Cl. 200—81.9)

ABSTRACT OF THE DISCLOSURE

A combination flow responsive switch and indicating gage comprising a mount for the gage in a conduit, the mount having a passageway therethrough, a single shaft extending through the passage to a housing on the exterior end of the mount and to an eccentrically mounted panel on the interior of the mount, in the conduit, a seal on the shaft in the passage to prevent flow of fluid therethrough, a pointer on the exterior end of the shaft for being rotated in response to the force of flow on the panel, a pair of contacts in the housing for being contacted by a movable contact on the pointer, an indicia bearing plate adjacent the pointer and the bias means resisting rotation of the shaft for giving an indication proportional to the rate of flow in the conduit and closing electrical contacts in case of an unduly high or unduly low flow rate is disclosed.

This invention relates to a flow responsive switch and more particularly to such a switch for manipulating electrical contacts to provide a signal when coolant flow is abnormal or to shut off an internal combustion engine associated with the fluid flow.

Various devices have been utilized by the prior art for continuously monitoring various operating indicia of an engine whereby the engine is shut off if an abnormal condition appears. For example, the monitoring of oil pressure has long been done to stop an engine when oil pressure falls below a predetermined value. The prior art has also used temperature responsive means for stopping such a motor when coolant temperature exceeds a predetermined limit. The monitoring of engine operating conditions by the industry has been largely limited to oil pressure and coolant temperature in the belief that most, if not all, engine malfunctions manifest themselves most readily in terms of oil pressure and coolant temperature.

There are many situations where large industrial engines, representing large amounts of invested capital, are continuously operated in remote unattended locations to perform various functions required in the environment. One such situation is found in the pumping of large amounts of water for irrigation, while other situations may readily be contemplated, such as the operation of gas compressor engines for pressurizing natural gas for transmission purposes.

Another situation involves engines powering earth moving and construction equipment and large "over-the-road" trucks where it is impossible for an operator to keep a continuous visual check on his engine instruments and where a loss of coolant flow could cause serious damage or destruction to the engine. It is not the intent or purpose of the present invention to replace engine oil pressure and coolant temperature safety shut-off switches, as their worth has been well proven, both on unattended power units and on the prime movers of trucks and construction equipment where they are now widely used. The present invention does, however, fulfill a need to protect such engines from causes of serious failures which cannot be monitored by pressure or temperature.

The coolant flow switch-gauge of the instant invention reacts immediately to coolant flow loss as a result of loss of coolant, low coolant level, air locking of the water pump, slippage of the water pump on its shaft, or a slipping or broken water pump belt. A temperature indicator senses only coolant temperature as it increases after one of the above failures.

As is well known by owners of those fleets of truck engines and large numbers of industrial engines, many prime movers are run to destruction when equipped with coolant temperature shutdown switches. A common example is the sudden bursting of a radiator hose which quickly exhausts all the coolant from the heat exchanging system. Since the coolant is the transfer medium which heats up a temperature switch responsive element, an abrupt loss of coolant will create a drop in temperature as measured by the sensor thereby circumventing the purpose of the high temperature shut off device. A flow responsive switch-gauge such as the present invention, would immediately act to sound an alarm or, through suitable means, to stop the engine from running.

On new engines being placed in service, or on engines which have been drained for service, or to add antifreeze, it frequently happens that the engine is started up and run—due to careless operators—without having coolant replaced in the system. Under these conditions, a temperature responsive switch would not have an opportunity to act, while a flow responsive switch would save the engine from destruction.

The need for coolant flow indicators has been recognized and attempts to solve this problem have been made by using coolant pressure differential indicators which, at best, are extremely difficult to calibrate on an operating system, and which do not provide visual indication as to their operating condition.

There has long been an expressed demand from engine manufacturers, fleet operators and those using large unattended engines for a supplemental safety system to fill the gap where temperature switches cannot function, or cannot function quickly enough to prevent damage. Under conditions as mentioned above, the flow-switch of the instant invention promptly signals an alarm or stops the engine. It is well known to operators of these engines that when they are operating with no coolant, heads will crack and valves will warp due to the rapid build-up of the heat of combustion long before the open passages provided for water flow—and containing temperature switch sensing bulbs—will get hot enough to indicate danger. The ambient temperature around these areas of combustion will, of course, eventually cause a temperature switch to work and may, in fact, melt solder connections away from the heat responsive bulb, but this would be long after the major damage occurs.

It is accordingly an object of the instant invention to provide a flow responsive switch which may be inserted in the coolant system of an engine for detecting the failure of coolant flow and for manipulating electrical contacts in order to activate or deactivate an electrical circuit interconnecting the switch and the engine ignition system to actuate an alarm.

Another object of the instant invention is to provide a flow responsive switch of the character described including means for calibrating the switch in accordance with the viscosity of the fluid utilized as a coolant.

Still another object of the instant invention is to provide a flow responsive switch equipped with a pointer which provides a visual indication of the flow status within the conduit monitored.

A further object of the instant invention is to provide a flow responsive switch of the character described made in the simplest manner possible to minimize construction costs, maintenance costs and to prolong a useful life thereof.

Other objects and advantages of the instant invention reside in the combinations of elements, arrangements of parts, and features of construction and operation, all as will be more fully pointed out hereinafter and disclosed in the accompanying drawing wherein there is shown the preferred embodiment of this inventive concept.

General construction and operation

Figure 1:
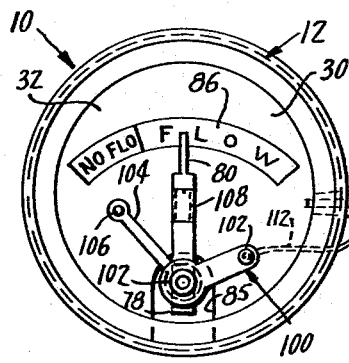
FIGURE 1 is a front elevational view of the flow responsive switch of the instant invention indicating that flow is occurring interiorly of the conduit with which the switch is associated.

Referring now to the drawings in detail, wherein like reference characters designate like elements throughout the several views thereof, there is indicated generally at 10 a flow responsive switch made in accordance with the principles of the instant invention having as its major components a housing shown generally at 12 interiorly of which is positioned a fluid flow indicating and contact closing mechanism shown generally at 14 with a fluid flow sensing means shown generally at 16 being positioned through an opening 18 into a conduit 20 with a suitable connecting means shown generally at 22. The remaining major component of switch 10 is an adjusting means shown generally at 24 for adjusting the ease of movement of fluid sensing means 16 such that switch 10 may be used with fluids of different viscosity. As will be explained more fully hereinafter, fluid flow sensing means 16 is rotated by fluid flow through conduit 20 and is interconnected with flow indicating and contact closing mechanism 14 such that upon cessation of fluid flow, a pair of electrical contacts will be opened or closed to deactivate a motor associated with switch 10.

Housing

Figure 2:
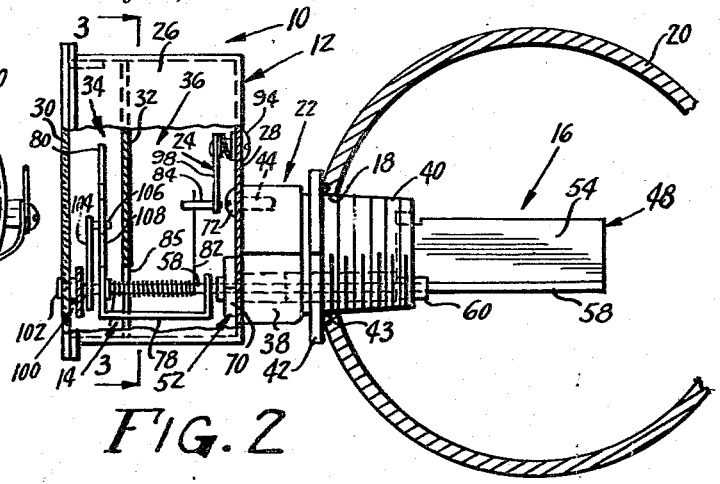
FIGURE 2 is a side elevational view of the switch of the instant invention in operative relationship with a suitable conduit, certain parts of a switch being broken away for clarity of illustrations.

Housing 12 is illustrated as having a cylindrical wall 26, a perpendicular wall 26, a perpendicular rear wall 28, a transparent cover 30 and a partition 32 dividing housing 12 into a visible compartment shown generally at 34 and a hidden compartment shown generally at 36. Fixedly secured to rear wall 28 is a hexagonal head 38 carrying male threads 40 constituting a part of connecting means 22. Connecting means 22 also includes a lock nut surrounding threads 40 for orienting housing 12 at a desired angle as is customary in the art. An O-ring 43 is sandwiched between lock nut 42 and conduit 20 to prevent leakage from between threads 40 and aperture 18. Although FIGURE 2 illustrates threads 40 extending a substantial distance into pipe 20, it should be apparent to those skilled in the art that neither sensing means 16 nor threads 40 need extend as far into pipe 20 as illustrated.

Flow responsive rotating means

Figure 4:
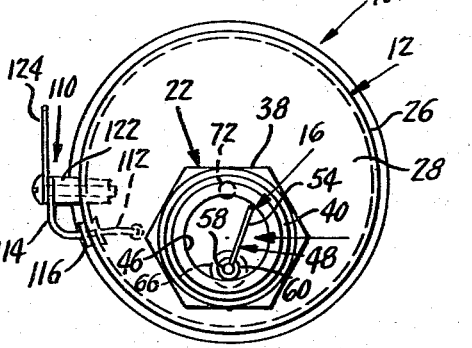
FIGURE 4 is a rear elevational view of the switch of the instant invention.

Hexagonal head 38 forms a circular passageway 44 extending parallel to but spaced from the longitudinal axis of head 38. Passageway 44 communicates with the lowermost portion of a blind circular recess 46 with a paddle wheel shown generally at 48 being mounted for rotation in passageway 44 by a press fit bearing shown generally at 50 and an apertured screw shown generally at 52. Paddle wheel 48 includes a generally rectangular blade 54 forming a cutout 56 received in recess 44 (FIGURE 5) carrying a shaft 58 on the lowermost edge of blade 54 extending through bearing 50 and screw 52 to mount blade 54 for rotation. A sleeve 60 is affixed about shaft 58 in abutting relation to bearing 50 thereby spacing the inner edge of blade 58 from the wall of recess 46. It should be noted that the cooperation between recess 46 and cutout 56 of blade 54 precludes over rotation of paddle wheel 48 in a simple and expeditious manner. It will be seen that fluid flowing toward the viewer in FIGURE 2 (corresponding to the right-to-left arrow in FIGURE 4) will rotate paddle blade 46 in a counterclockwise direction as shown by the arcuate arrow in FIGURE 4.

Bushing 50 may be of any suitable type and is illustrated as including a resilient core 62 surrounded by a sleeve 64 having a diminished internal diameter to prevent axial displacement of core 62. It will be seen that bearing 50 not only rotatably mounts shaft 58 but also precludes entry of coolant into housing 12 by the close tolerances between passageway 44, sleeve 64, core 62 and shaft 58.

Screw 52 includes a threaded shank 66 received in the threaded end 68 of passageway 44. A bolt type head 70 is integral with shank 68 and acts to secure head 38 to back wall 28 in conjunction with a conventional screw 72 spaced above the longitudinal axis of head 38. Screw 52 forms an enlarged passage 74 throughout the length of shank 68 and a smaller passage 76 acting as a bearing to journal shaft 58 for rotation.

Figure 3:
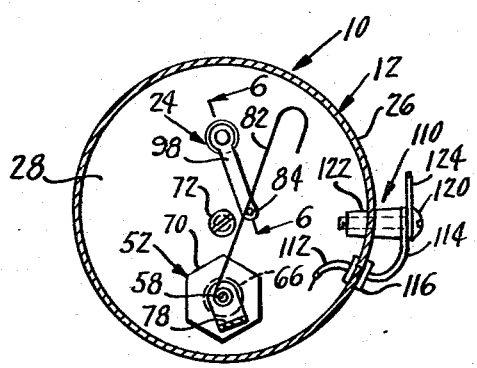
FIGURE 3 is a transverse cross-sectional view of the flow responsive switch of FIGURES 1 and 2 taken substantially along line 3—3 of FIGURE 2 as viewed in the direction of the arrows.
Figure 5:
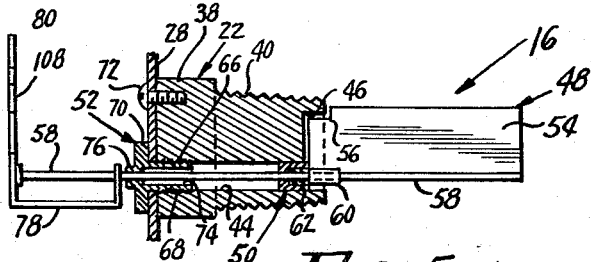
FIGURE 5 is a longitudinal cross-sectional view of the device of FIGURES 1–4 inclusive illustrating the pointer rotating means.

Referring now to FIGURES 2, 3 and 5, a U-shaped bracket 78 is affixed to shaft 58 and carries a pointer 80 thereon for rotation with shaft 58. A spring wire 82 is coiled about shaft 58 and includes an upstanding arm abutting a post 84 of adjustment means 24. The other end of spring 82 is fixedly secured to shaft 58, bracket 78 or pointer 80 in any suitable fashion to bias shaft 58 in a clockwise direction opposite to the arcuate arrow shown in FIGURE 4. Because of the biased nature of shaft 58 and paddle blade 48, the extent of counterclockwise deflection of paddle blade 48 will be directly proportional to the rate of fluid flow through conduit 20.

As best shown in FIGURE 2, the forward end of shaft 58 and bracket 78 extend through an opening 85 in partition 32 such that pointer 80 is positioned adjacent a dial 86 inside visible compartment 34 while the majority of working parts of switch 10 are disposed in hidden compartment 36. In order to provide a visual indication of flow, dial 86 is provided with suitable indicia so that an attendant may readily determine whether fluid flow is occurring within conduit 20. It should be readily apparent that dial 86 may be on the exterior or interior surface of transparent cover 30 or on the outer surface of partition 32.

Adjustment means

Adjusting means 24 is used to vary the forces produced by spring 82 on pointer 80 to correlate properly the force produced on paddle blade 46 with the desired amount of movement of pointer 80. It will be apparent to those skilled in the art that a dense viscous liquid flowing at a given rate in pipe 20 will deflect paddle blade 46 a greater extent than a light free flowing fluid. Although it has not been found necessary to manipulate adjusting means 24 after it is set for a given installation, it will be apparent that since coolant liquids may vary from location to location, some means is desirable to control pointer 80.

Figure 6:
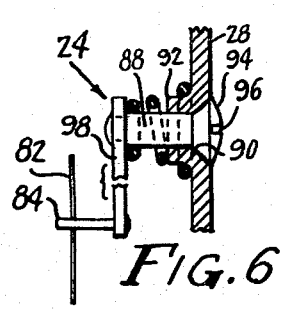
FIGURE 6 is a cross-sectional view of the device of FIGURES 1–4 inclusive taken substantially along line 6—6 of FIGURE 3 as viewed in the direction of the arrows.

As shown best in FIGURES 2, 3 and 6, adjusting means 24 includes a shaft 88 mounted for rotation in a countersunk opening 90 around which is formed an exterior sleeve 92. Shaft 88 carries a countersunk head 94 on the exterior side of back wall 28 and has a suitable slot 96 for receiving a screwdriver in a conventional manner. Fixedly connecting shaft 88 to post 84 is an arm 98 transmitting the rotation of shaft 88 to increase or decrease the force produced by spring 82. It will accordingly be seen that the force necessary to deflect pointer 80 a given distance may be controlled by the rotation of shaft 88. The upper end of spring 82 is hooked to preclude disengagement of post 84 and spring 82 during the adjustment of spring 82.

*Electric circuit*

Positioned on the inside face of transparent cover 30 is an electrically conductive contact assembly shown generally at 100 secured thereto by a plurality of frictional fasteners such as rivets 102. In electrical communication with contact assembly 100 is a metal arm 104 carrying a stationary electrical contact 106 residing in the path of a movable electrical contact 108 on pointer 80. It will be seen that spring wire 82 biases shaft 58 and consequently pointer 80 toward stationary contact 106 such that the cessation of fluid flow through conduit 20 results in movable contact 108 coming into engagement with stationary contact 106.

Figure 7:
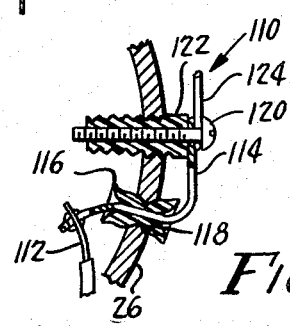
FIGURE 7 is a cross-sectional view of the outlet terminal of the device of the instant invention.

Providing communication between contact assembly 100 and an outlet terminal shown generally at 110 is an insulated wire 112 which passes through an insulating grommet (not shown) in partition 32. As shown best in FIGURE 7, insulated wire 112 is connected to an L-shaped metallic arm 114 which passes through an insulating grommet 116 positioned in an opening 118 in housing wall 26. Arm 114 is in electrical communication with a screw 120 received in an insulating bushing 122 secured in housing wall 26. A suitable electrical wire 124 connects terminal 110 to a conventional engine stopping switch, examples of which may be found in United States Patents 2,358,729 and 2,722, 576.

It should be readily apparent that switch 10 of the instant invention includes two electric paths, the first including stationary contact 106, arm 104, contact assembly 100, insulated wire 112 and outlet terminal 110 for connection to a suitable engine stopping switch. The second electrical path of switch 10 includes movable contact 108, pointer 80, shaft 58, screw 52 and head 38 leading to conduit 20 which is grounded. Accordingly, the closing of contacts 106, 108 connects the two electric paths thereby actuating the engine stopping switch to which switch 10 is attached. It should be apparent, however, that the second electrical path may be arranged to communicate with an external terminal similar to terminal 110. It should also be apparent that contacts 106, 108 may be of the normally closed type arranged to open upon the cessation of fluid flow in conduit 20.

It is now seen that there is herein provided an improved flow responsive switch for controlling electrical contacts which accomplishes all of the objects and advantages of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

We claim:
1. A combination flow responsive switch and indicating gauge which, in combination, comprises:
an elongate means for connecting the switch to a fluid carrying conduit, said connecting means having a longitudinal passage therethrough;
a housing for the switch and gauge components secured at the exterior end of the connecting means;
a single shaft extending from the housing through the passage to extend into the conduit;
at least one annular seal in the passage to prevent fluid flow therethrough and to permit free rotation of the shaft therein;
an eccentrically mounted paddle on the shaft in the conduit, said paddle being so constructed and so disposed as to rotate the shaft about its longitudinal axis in response to fluid flow;
means resiliently biasing the shaft against rotation for causing the degree of rotation to be proportional to the rate of fluid flow;
a pointer carried by the shaft in the housing;
a contact carried by the pointer;
a plate carrying indicia adjacent the pointer for marking the flow rate; and
a contact in the housing for being engaged by the contact carried by the pointer, said pointer contact and said contact being adapted to complete an electrical circuit upon engagement.
2. The invention of claim 1 further comprising:
an additional contact in the housing, said additional contact being disposed for being engaged by the pointer contact, said contacts being so arranged and constructed as to compete an electrical circuit with the pointer contact upon, respectively, a high flow rate or a low flow rate.
3. The invention of claim 2 further comprising:
means for adjusting the bias means for calibrating the gauge.

References Cited

UNITED STATES PATENTS

| | | | |
|---|---|---|---|
| 1,249,120 | 12/1917 | Knight | 73—228 |
| 1,574,460 | 2/1926 | Williamson | 200—81.9 |
| 2,917,922 | 12/1959 | Morse | 73—228 |
| 2,952,753 | 9/1960 | Kmiecik et al. | 200—81.9 |

BERNARD A. GILHEANY, *Primary Examiner.*

H. BROOME, *Assistant Examiner.*